Aug. 27, 1946.    J. H. RICHARDSON    2,406,401
MOLD FOR USE IN THE MANUFACTURE OF OPTICAL ELEMENTS
Filed Sept. 2, 1942

John H. Richardson
INVENTOR.

BY Donald L. Brown
Attorney

Patented Aug. 27, 1946

2,406,401

UNITED STATES PATENT OFFICE 2,406,401

MOLD FOR USE IN THE MANUFACTURE OF OPTICAL ELEMENTS

John H. Richardson, Needham, Mass., assignor to Polaroid Corporation, Cambridge, Mass., a corporation of Delaware Application September 2, 1942, Serial No. 457,033

2 Claims. (Cl. 18—34)

This invention relates to an improved mold for use in the manufacture of optical elements formed of polymerized synthetic plastics, resins, and like materials.

An object of the invention is to provide a mold of the character described comprising a plurality of elements having optically smooth surfaces for molding the light-transmitting faces of a plastic optical element and a cement for simultaneously positioning said elements, sealing the joints between said elements, and for forming those walls of the mold which are not intended to mold light-transmitting faces of the molded element.

Other objects of the invention are the provision of a mold of the character described in which the cement employed is a water-soluble cement; in which the cement employed is a metal or metallic alloy which may be applied in fluid condition to the molding elements, which sets up little or no strain therein as it hardens or solidifies, which remains solid at temperatures employed in the polymerization of a plastic optical element in the mold but which softens and fuses at temperatures not greatly in excess thereof; the provision of a cement or bonding material which provides an airtight seal; the provision of a mold of the character described in which a plurality of mold walls are formed of the cement; the provision of a mold for optical wedges in which all molding faces except the two principal optical surfaces are formed of the cement; and the provision of molds of the character described in which all of the elements forming the mold, including the cement and the elements providing the optically smooth surfaces of the mold, may be repeatedly reused.

Other objects of the invention will in part be obvious and will in part appear hereinafter.

The invention accordingly comprises the product possessing the features, properties and relation of elements which will be exemplified in the following detailed disclosure and the scope of the application of which will be indicated in the claims.

Figure 1:
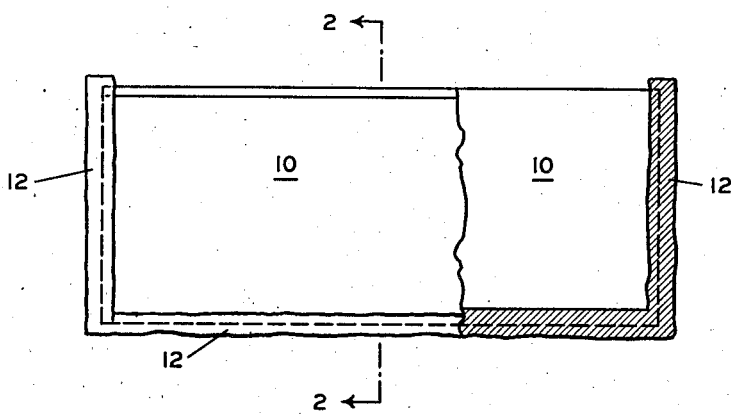
Figure 2:
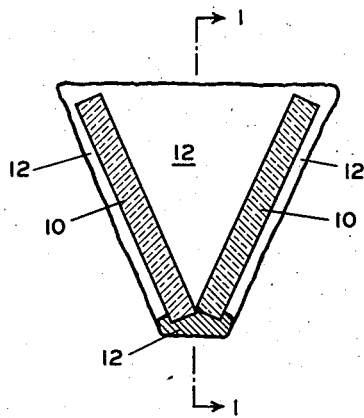

For a fuller understanding of the invention reference should be had to the following detailed description, taken in connection with the accompanying drawing, in which:

Figure 1 is a side elevation partly in section along the line 1—1 in Fig. 2 showing a mold constituting one embodiment of the invention; and Fig. 2 is a section along the line 2—2 in Fig. 1.

With the development of plastic optical devices such as prisms, lenses and the like, the provision of suitable molds has presented a problem of considerable difficulty. One of the main elements of cost in the production of such devices is the cost of the mold, particularly where attempts are made to produce, directly from the mold, optical elements of uniform optical properties and with optically smooth light-transmitting surfaces. If the cost of such molded products is to be kept low it is essential that the molds be of a type which can be repeatedly reused, and it is highly desirable that all the elements and materials comprising the mold, including the elements forming the molding faces and the adhesive or cement employed in sealing these elements, be reclaimable and readily prepared for subsequent use.

In the manufactuer of molded optical elements from synthetic plastic or resinous materials the plastic material is ordinarily introduced into the mold in a monomeric or partially polymerized condition, and polymerization is then carried forward within the mold until it is substantially complete. Plastic materials which have been found particularly suitable in the production of such molded optical elements are cyclohexyl methacrylate, styrene, methyl methacrylate, and similar materials. With materials of this class polymerization temperatures are preferably maintained not greatly in excess of 90 degrees C.

This invention is directed primarily to the provision of a mold for optical elements of the type of optical wedges or thin prisms wherein only two faces of the mold element are employed as light-transmitting faces, and where the ends of the element are in the shape of relatively long, narrow wedges. It has been found that with molds of this type satisfactory results can be obtained at considerable saving in cost by forming the ends of the mold of the same material used to cement together the two walls of the mold which form the light-transmitting faces of the molded element. These mold walls may preferably comprise plates of glass having optically smooth molding surfaces. They may be mounted in position with the edges forming the apex of the wedge or narrow prism in close contact and with removable wedge elements positioned adjacent the ends of the glass plates. This mounting may be accomplished in any suitable jig or fixture. A suitable cement may then be applied to the apex of the mold and along both ends so as to completely cover the removable wedges holding the glass plates in position. When the cement has dried or hardened the wedges may be removed and the mold then filled with the partially polymerized or monomeric plastic.

The cement employed is preferably one which may be applied in a molten or liquid condition, and which sets quickly when dried or cooled. It is preferably one which provides an airtight seal and which sets up little or no strain in the glass molding elements.

Examples of suitable fusible metals for use in the practice of the present invention are the alloys known as Wood's metal and Rose's metal. Any other suitable cement may be employed provided it fuses at a temperature above but not greatly above the temperatures employed in effecting polymerization of the plastic introduced into the mold. A fusible cement having a melting point slightly in excess of 90 degrees C. is preferred. Such a cement may be poured around the mold joints without injury to the glass mold elements and may be readily removed from the mold by melting the cement at a temperature which does not injure the molded plastic. A cement of this type which is particularly useful in the present invention is the material sold commercially as Belmont Brand No. 255 low melting alloy solder, an alloy of bismuth and lead in the proportions of substantially five parts of bismuth to four parts of lead. This material has little if any expansion or contraction at the temperature at which it solidifies, and therefore sets up no strain in the glass molding elements.

Examples of suitable soluble cements which are useful in the present invention are a mixture of sodium silicate with a suitable filler, such as wood flour, pumice, or the like, and the refractory water-soluble cement sold under the trade name "Insalute." Either of these cements may be applied in fluid condition, rapidly dried and removed from the mold after polymerization of the plastic therein has been completed by immersing the mold in water, in which either cement is soluble.

The drawings illustrate a mold embodying the features of the present invention. The molding elements, i. e. the walls made of glass or other suitable molding material and having optically smooth molding surfaces are illustrated at 10. They are bonded together and held in position by the cement 12, which it will be noted not only seals the apex of the mold but forms as well the two ends thereof. In the drawings the base of the mold is shown as uncovered. Under these circumstances it will be understood that the mold is held, during the polymerization of the plastic therein, with its apex down. It will of course be understood that the base may also be covered either by a cover plate or by an extension of the cement forming the end walls.

Since certain changes may be made in the above product and different embodiments of the invention could be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A mold for use in the formation of a prism of polymerized synthetic plastic material comprising, in combination, a plurality of angularly positioned optically smooth mold walls of glass for molding the light-transmitting surfaces of said prism, and a cement comprising a low melting point, fusible metallic alloy rigidly bonding said walls together and forming a plurality of additional mold walls.

2. A mold for use in the formation of a prism of polymerized synthetic plastic material comprising, in combination, a pair of angularly positioned optically smooth mold walls of glass for molding the light-transmitting surfaces of said prism, and a fusible metallic alloy rigidly bonding said walls together and forming a pair of end walls for said mold.

JOHN H. RICHARDSON.